(12) United States Patent
Veeningen et al.

(10) Patent No.: US 8,688,487 B2
(45) Date of Patent: Apr. 1, 2014

(54) METHOD AND SYSTEM FOR MEASURING TECHNOLOGY MATURITY

(75) Inventors: Daan Veeningen, Houston, TX (US); Sanjaya Sood, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 1749 days.

(21) Appl. No.: 12/105,223

(22) Filed: Apr. 17, 2008

(65) Prior Publication Data

US 2008/0262886 A1 Oct. 23, 2008
US 2009/0119139 A2 May 7, 2009

Related U.S. Application Data

(60) Provisional application No. 60/925,102, filed on Apr. 18, 2007.

(51) Int. Cl.
*G06Q 10/00* (2012.01)
(52) U.S. Cl.
USPC ........................................ 705/7.11
(58) Field of Classification Search
None
See application file for complete search history.

(56) References Cited

U.S. PATENT DOCUMENTS

| | | | | |
|---|---|---|---|---|
| 4,794,534 A | * | 12/1988 | Millheim | 702/9 |
| 5,058,012 A | * | 10/1991 | Hinchman et al. | 702/12 |
| 5,139,094 A | | 8/1992 | Prevedel et al. | |
| 5,444,619 A | | 8/1995 | Hoskins et al. | |
| 5,680,906 A | | 10/1997 | Andrieux et al. | |
| 5,899,958 A | | 5/1999 | Dowell et al. | |
| 5,992,519 A | | 11/1999 | Ramakrishnan et al. | |
| 6,176,312 B1 | | 1/2001 | Tubel et al. | |
| 6,266,619 B1 | | 7/2001 | Thomas et al. | |
| 6,313,837 B1 | | 11/2001 | Assa et al. | |
| 6,810,332 B2 | * | 10/2004 | Harrison | 702/13 |
| 6,980,940 B1 | * | 12/2005 | Gurpinar et al. | 703/10 |
| 7,003,439 B2 | | 2/2006 | Aldred et al. | |
| 7,079,952 B2 | | 7/2006 | Thomas et al. | |
| 7,142,986 B2 | | 11/2006 | Moran | |
| 7,878,268 B2 | * | 2/2011 | Chapman et al. | 175/57 |
| 2003/0132934 A1 | | 7/2003 | Fremming | |
| 2003/0216897 A1 | | 11/2003 | Endres et al. | |

(Continued)

FOREIGN PATENT DOCUMENTS

| | | |
|---|---|---|
| GB | 2392931 | 3/2004 |
| GB | 2411669 | 9/2005 |
| WO | 99/64896 A1 | 12/1999 |
| WO | 2004049216 | 6/2004 |

OTHER PUBLICATIONS

International Search Report dated Aug. 22, 2008 (3 pages).

*Primary Examiner* — Jonathan G Sterrett
*Assistant Examiner* — Folashade Anderson

(57) ABSTRACT

A method for measuring technical maturity index (TMI) for oilfield operations of an oilfield, the oilfield having a subterranean formation with geological structures and reservoirs therein. The method includes sending an assessment including a listing of a number of capabilities to at least one user associated with a first oilfield operation, where each of the number of capabilities is associated with a technology for the oilfield operations, and receiving a first number of responses in response to the assessment for the first oilfield operation, where each of the first number of responses specifies one of the number of capabilities and a level of adoption corresponding to the one of the number of capabilities. The method further includes obtaining a TMI for the first oilfield operation using the first number of responses and presenting the TMI for the first oilfield operation.

19 Claims, 8 Drawing Sheets

(56) References Cited

U.S. PATENT DOCUMENTS

| | | |
|---|---|---|
| 2004/0220846 A1 | 11/2004 | Cullick et al. |
| 2005/0119911 A1* | 6/2005 | Ayan et al. ............ 705/1 |
| 2005/0149307 A1 | 7/2005 | Gurpinar et al. |
| 2005/0209836 A1 | 9/2005 | Klumpen et al. |
| 2005/0209886 A1 | 9/2005 | Corkern |
| 2005/0211468 A1 | 9/2005 | Veeningen et al. |
| 2005/0228905 A1 | 10/2005 | Veeningen et al. |
| 2005/0236184 A1 | 10/2005 | Veeningen et al. |
| 2006/0197759 A1 | 9/2006 | Fremming |
| 2007/0061180 A1* | 3/2007 | Offenberg ............ 705/8 |
| 2007/0112547 A1 | 5/2007 | Ghorayeb et al. |

\* cited by examiner

FIG.8

| | Systematically | Occasionally | Rarely |
|---|---|---|---|
| Automation and Autonomous Action | ○ | ○ | ⊙ |
| Model-based Corrective Action | ○ | ○ | ⊙ |
| Global Collaboration | ○ | ○ | ⊙ |
| Model-centric Diagnostics | ○ | ○ | ⊙ |
| Remote Actuation and Operation | ○ | ○ | ⊙ |
| Extended Team and Expertise | ○ | ○ | ⊙ |
| Diagnostics and Analysis | ○ | ○ | ⊙ |
| Surveillance with Warning Capabilities | ○ | ○ | ⊙ |
| Monitoring Activities | ○ | ○ | ⊙ |
| Data Acquisition and Transmission | ○ | ○ | ⊙ |

Select the geographic region — 802
Select the oilfield operation — 804

Please select the adoption level of each of the following capabilities 806, 808, 810 — Submit

800

METHOD AND SYSTEM FOR MEASURING TECHNOLOGY MATURITY

CROSS-REFERENCE TO RELATED APPLICATIONS

This application claims priority, pursuant to 35 U.S.C. §119(e), to the filing date of U.S. Patent Application Ser. No. 60/925,102, entitled "Method and System for Measuring Technology Maturity," filed on Apr. 18, 2007, which is hereby incorporated by reference in its entirety.

BACKGROUND

Oilfield operations, such as surveying, drilling, wireline testing, completions and production, are typically performed to locate, gather, store and transport valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

A formation is a distinctive and continuous body of rock that it can be mapped. Spaces between the rock grains ("porosity") of a formation may contain fluids such as oil, gas or water. Connections between the spaces ("permeability") may allow the fluids to move through the formation. Formations with sufficient porosity and permeability to store fluids and allow the fluids to move are known as reservoirs. A structure is a geological feature that is created by deformation of the Earth's crust, such as a fold or fault, a feature within the rock itself (such as a fracture) or, more generally, an arrangement of rocks. The above definitions are taken from Schlumberger's Oilfield Glossary (www.glossary.oilfield.slb.com), but in the industry, the terms formation and structure may be loosely used synonymously.

The complex operations of drilling and completing wells are well known by those of skill in the art and the description here is a simplified view. As shown in FIG. 1B-1D, one or more wellsites may be positioned to penetrate the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a planned path to access the reservoirs containing the valuable assets. Fluid, such as drilling mud or other drilling fluids, is pumped down the inside the drilling tools, and out of a drilling bit at the bottom of the drilling tools. The drilling bit is used to grind up the earth. After leaving the drilling bit, the drilling fluids flow between the outside of the drilling tools and the inside of the wellbore and back up to the surface. The drilling fluids bring the ground earth to the surface and hold back fluids from formations from prematurely entering the wellbore. During the drilling operation, the drilling tools may include components to perform downhole measurements to investigate the formations encountered. The drilling tools may be used to take samples of the formations, such as core samples. At various points in the drilling, the drilling is stopped and the drilling tools removed from the well. At such a point, as shown in FIG. 1C, after the drilling tools are removed, a wireline tool is deployed into the wellbore to perform additional downhole testing. Wireline tools may also be used to take samples of the formations or to sample the fluids in the formations. At such points, as is known in the art, after any desired wireline tools are run and removed, steel casing may be run into the well to depth and cemented into place to shore up the wellbore and to protect the formations through which the wellbore has passed. The drilling continues in the manner until the desired total depth is reached.

After the drilling operation is complete, the well may then be prepared for production. As shown in FIG. 1D, wellbore completions equipment is deployed into the wellbore to complete the well in preparation for the production of fluid therethrough. Fluid is allowed to flow from downhole reservoirs, into the wellbore and flows to the surface, generally through tubing and their completion equipment positioned in the wellbore. At the surface, the fluids flow through a wellhead and Christmas tree and into a production line. Production facilities are positioned at surface locations to collect the hydrocarbons from the wellsite(s) and to separate and direct fluids from the wells. Various equipment may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to formation structure and geological stratigraphy, which defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface, preferably using production tubing as shown in FIG. 1D. As fluid passes to the surface, various dynamic measurements, such as fluid flow rates, pressure and composition may be monitored. These parameters may be used to determine various characteristics of the subterranean formation.

Sensors may be positioned throughout the oilfield to collect data relating to various oilfield operations. For example, sensors in the wellbore may monitor fluid composition, sensors located along the flow path may monitor flow rates and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine where to drill new wells, how to re-complete or stimulate existing wells, or alter wellbore production.

Data from one or more wellbores may be analyzed to plan or predict various outcomes at a given wellbore. In some cases, the data from neighboring wellbores, wellbores into the same formations or wellbores with similar conditions or equipment is used to predict how a well will perform. There are usually a large number of variables and large quantities of data to consider in analyzing wellbore operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities as well as other portions of the oilfield operation. Examples of modeling techniques are shown in patent/application/Publication Nos. U.S. Pat. No. 5,992,519, WO2004/049216, WO1999/064896, U.S. Pat. No. 6,313,837, US2003/0216897, US2003/0132934, US2005/0149307, and US2006/0197759. Typically, existing modeling techniques have been used to analyze only specific portions of the oilfield operation. More recently, attempts have been made to use more than one model in analyzing certain oilfield operations. See, for example, patent/application/Publication Nos. U.S. Pat. No. 6,980,940, WO2004/049216, US2004/0220846, and US10/586,283.

Techniques have also been developed to predict and/or plan certain oilfield operations, such as drilling operations. Examples of techniques for generating drilling plans are provided in patent/application/Publication Nos. US2005/0236184, US2005/0211468, US2005/0228905, US/2005/0209886, and US2005/0209836. Some drilling techniques involve controlling the drilling operation. Examples of such drilling techniques are shown in patent/application Nos. GB2392931 and GB2411669. Other drilling techniques seek to provide real-time drilling operations. Examples of techniques purporting to provide real time drilling are described in patent/application Nos. U.S. Pat. Nos. 7,079,952, 6,266,619, 5,899,958, 5,139,094, 7,003,439, and U.S. Pat. No. 5,680,906.

A variety of technologies may be used to perform oilfield operations. In order to ensure efficiency in the oilfield operations, a company may implement methodologies for evaluating the effectiveness of the technologies. For example, information related to various aspects of the technologies may be collected and processed in a data repository.

Typically, a user of a particular technology may provide an evaluation based on his or her use of the technology. In some cases, a company may have a standard evaluation used to evaluate technologies based on a variety of factors such as: cost, ease of use, support, effectiveness, or some other factor related to the overall efficiency of the technology. In addition, a company may perform research and preliminary trials of potential technologies to evaluate the potential efficiency of the technologies.

As the number of utilized technologies increase, a more formal method may be adopted to manage the volume of information. For example, a spreadsheet may be used to consolidate information related to a variety of technologies. In another example, a business plan or method may include a specific technology adoption plan.

SUMMARY

In general, in one aspect, the invention relates to a method for measuring technical maturity index (TMI) for oilfield operations of an oilfield, the oilfield having a subterranean formation with geological structures and reservoirs therein. The method includes sending an assessment including a listing of a number of capabilities to at least one user associated with a first oilfield operation, where each of the number of capabilities is associated with a technology for the oilfield operations, and receiving a first number of responses in response to the assessment for the first oilfield operation, where each of the first number of responses specifies one of the number of capabilities and a level of adoption corresponding to the one of the number of capabilities. The method further includes obtaining a TMI for the first oilfield operation using the first number of responses and presenting the TMI for the first oilfield operation.

In general, in one aspect, the invention relates to a system for measuring technical maturity index (TMI) for oilfield operations of an oilfield, the oilfield having a subterranean formation with geological structures and reservoirs therein. The system includes an assessment manager configured to send an assessment including a listing of a number of capabilities to at least one user associated with a first oilfield operation, where each of the number of capabilities is associated with a technology for the oilfield operations, and receive a first number of responses in response to the assessment for the first oilfield operation, where each of the first number of responses specifies one of the number of capabilities and a level of adoption corresponding to the one of the number of capabilities. The system further includes a technology maturity manager configured to obtain a TMI for the first oilfield operation using the first number of responses. The system further includes a technology maturity reporting tool operatively connected to the assessment manager and the technology maturity manager and configured to present the TMI for the first oilfield operation.

In general, in one aspect, the invention relates to a computer readable medium including computer program code embodied therein for causing a computer system to measure technical maturity index (TMI) for oilfield operations of an oilfield, the oilfield having a subterranean formation with geological structures and reservoirs therein. The computer program code includes program instructions to send an assessment including a listing of a number of capabilities to at least one user associated with a first oilfield operation, where each of the number of capabilities is associated with a technology for the oilfield operations, and receive a first number of responses in response to the assessment for the first oilfield operation, where each of the first number of responses specifies one of the number of capabilities and a level of adoption corresponding to the one of the number of capabilities. The computer program code further includes program instructions to obtain a TMI for the first oilfield operation using the first number of responses and present the TMI for the first oilfield operation.

Other aspects of the invention will be apparent from the following description and the appended claims.

BRIEF DESCRIPTION OF DRAWINGS

FIG. 8 shows a graphical user interface (GUI) in accordance with one or more embodiments of the invention.

DETAILED DESCRIPTION

Figure 1A:
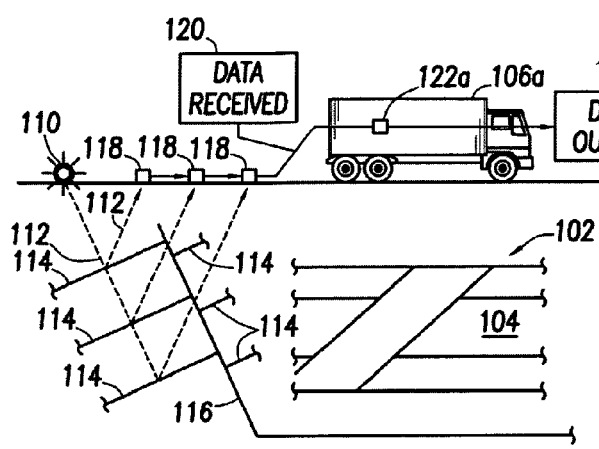
FIGS. 1A-1D depict a schematic view of an oilfield having subterranean formations containing geological structures and reservoirs therein, various oilfield operations being performed on the oilfield.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method and a system for measuring technology maturity. More specifically, embodiments of the invention relate to obtaining technology maturity indexes for oilfield operations based on responses to assessments for the oilfield operations. A response may specify the level of adoption of capabilities for generating the technology maturity index of an oilfield operation. Embodiments of the invention also include functionality to increase the technology maturity index of an oilfield operation.

The invention involves applications generated for the oil and gas industry. FIGS. 1A-1D depict an exemplary oilfield (100) with subterranean formations therein. More specifically, FIGS. 1A-1D depict schematic views of an oilfield (100) having subterranean formations (102) including a reservoir (104) therein and depicting various oilfield operations being performed on the oilfield (100). Various measurements of the subterranean formations (102) may be taken by different tools at the same location. These measurements may be used to generate information about the subterranean formations (102) and/or the reservoir(s) (104) and/or fluids contained therein.

FIG. 1A depicts a survey operation being performed by a seismic truck (106a) to measure properties of the subterranean formation. The survey operation is a seismic survey operation for producing sound vibrations. In FIG. 1A, an acoustic source (110) produces sound vibrations (112) that reflects off a plurality of horizons (114) in an earth formation (116). The sound vibration(s) (112) is (are) received by sensors, such as geophone-receivers (118), situated on the earth's surface. Upon receipt of the sound vibrations, the geophones (118) produce electrical output signals, referred to as data received (120) in FIG. 1A.

The received sound vibration(s) (112) are representative of different parameters (such as amplitude and/or frequency). The data received (120) is provided as input data to a computer (122a) within the seismic recording truck (106a), and responsive to the input data, the recording truck computer (122a) generates a seismic data output record (124). The seismic data (within the seismic data output record (124)) may be further processed as desired, for example by data reduction.

Figure 1B:
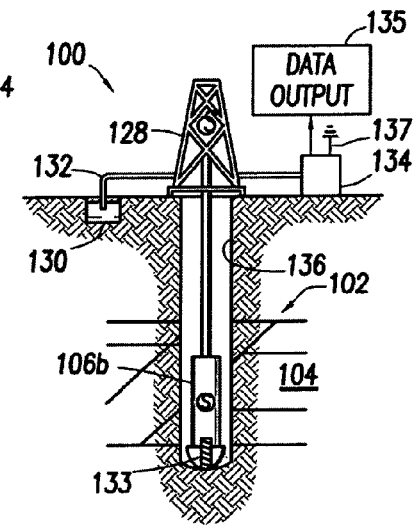

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via flow line (132) for circulating drilling mud through the drilling tool (106b) and back to the surface. The drilling tool (106b) is advanced into the formation to reach one or more reservoirs (104). The drilling tool (106b) is preferably adapted for measuring downhole properties. The logging while drilling tool may also be adapted for taking a core sample (133) as shown, or removed so that a core sample may be taken using another tool.

A surface unit (134) is used to communicate with the drilling tool and offsite operations. The surface unit (134) is capable of communicating with the drilling tool to send commands to drive the drilling tool, and to receive data therefrom. The surface unit (134) is preferably provided with computer facilities for receiving, storing, processing and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool) or other portions of the oilfield (100) for gathering information about various parameters, such as surface parameters, downhole parameters and/or operating conditions. These sensors (S) preferably measure oilfield parameters, such as weight on bit, torque on bit, pressures, temperatures, flow rates, compositions, measured depth, azimuth, inclination and other parameters of the oilfield operation.

The information gathered by the sensors may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors positioned about the oilfield (100) may be processed for use. The data may be may be historical data, real time data or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical and/or reservoir engineering simulations. The reservoir, wellbore, surface and/or process data may be used to perform reservoir, wellbore, or other production simulations. The data outputs from the oilfield operation may be generated directly from the sensors, or after some preprocessing or modeling. These data outputs may act as inputs for further analysis.

The data is collected and may be stored at the surface unit (134). One or more surface units may be located at the oilfield (110), or coupled remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) and/or other locations, such as a remote office. The surface unit (134) may also be provided with or functionally linked and/or coupled to a controller for actuating mechanisms at the oilfield (100). The surface unit (134) may then send command signals to the oilfield (100) in response to data received. The surface unit (134) may receive commands via the transceiver or may itself execute commands to the controller. A processor (not shown) may be provided to analyze the data (locally or remotely) and make the decisions to actuate the controller. In this manner, the oilfield (100) may be selectively adjusted based on the data collected. These adjustments may be made automatically based on computer protocol, or manually by an operator. In some cases, well plans and/or well placement and/or well equipment (subsurface or production equipment) may be adjusted to select optimum operating conditions, or to avoid problems.

Figure 1C:
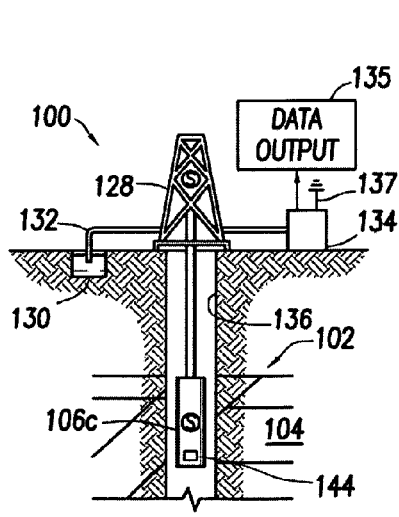

FIG. 1C depicts a wireline operation being performed by a wireline tool (106c) suspended by the rig (128) and into the wellbore (136) of FIG. 1B. The wireline tool (106c) is preferably adapted for deployment into a wellbore for performing well logs, performing downhole tests and/or collecting samples. The wireline tool (106c) of FIG. 1C may have, for example, a nuclear, explosive or acoustic energy source (144) that provides signals to the surrounding subterranean formations (102) and receives signals indicative of properties of the subterranean formations or the fluids contained in reservoirs.

The wireline tool (106c) may provide data to a surface unit (134) of FIG. 1C. As shown data output (135) is generated by the wireline tool (106c) and collected at the surface. The wireline tool (106c) may be positioned at various depths in the wellbore (136) to provide a survey of the subterranean formation (102).

Figure 1D:
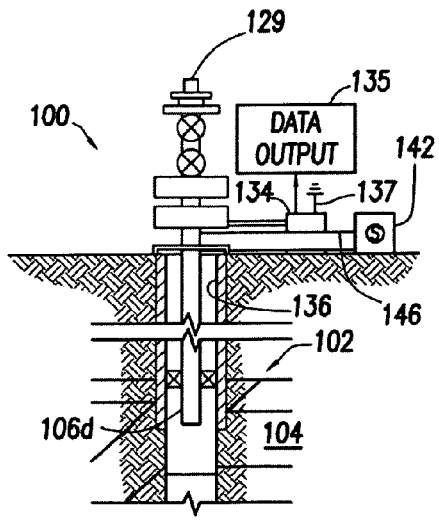

FIG. 1D depicts a production operation being performed by a production tool (106d) deployed from a production unit or Christmas tree (129) and into the completed wellbore (136) of FIG. 1C for drawing fluid from the downhole reservoirs into surface facilities (142). Fluid flows from reservoir (104) through perforations in the casing (not shown) and into the production tool (106d) in the wellbore (136) and to the surface facilities (142) via a gathering network (146).

Sensors (S), such as gauges, positioned about the oilfield are operatively connected to a surface unit (142) for collecting data therefrom. During the production process, data output (135) may be collected from various sensors and passed to the surface unit and/or processing facilities. As shown, the sensor (S) may be positioned in the production tool (106d) or associated equipment, such as the christmas tree (129), gathering network (146), surface facilities (142) and/or the production facility, to measure fluid parameters, such as fluid composition, flow rates, pressures, temperatures, and/or other parameters of the production operation.

While only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite(s).

Throughout the oilfield operations depicted in FIGS. 1A-D, there are numerous business considerations. For example, the equipment used in each of these figures has various costs and/or risks associated therewith. At least some of the data collected at the oilfield (100) relates to business considerations, such as value and risk. This business data may include, for example, production costs, rig time, storage fees, price of oil/gas, weather considerations, political stability, tax rates, equipment availability, geological environment and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

While FIG. 1B-1D depicts monitoring tools used to measure properties of an oilfield (100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration of FIG. 1A-1D is intended to provide a brief description of an example of an oilfield usable with the present invention. Part, or all, of the oilfield (100) may be on land and/or sea. Also, while a single oilfield measured at a single location is depicted, the present invention may be utilized with any combination of one or more oilfields, one or more processing facilities and one or more wellsites.

Figure 2:
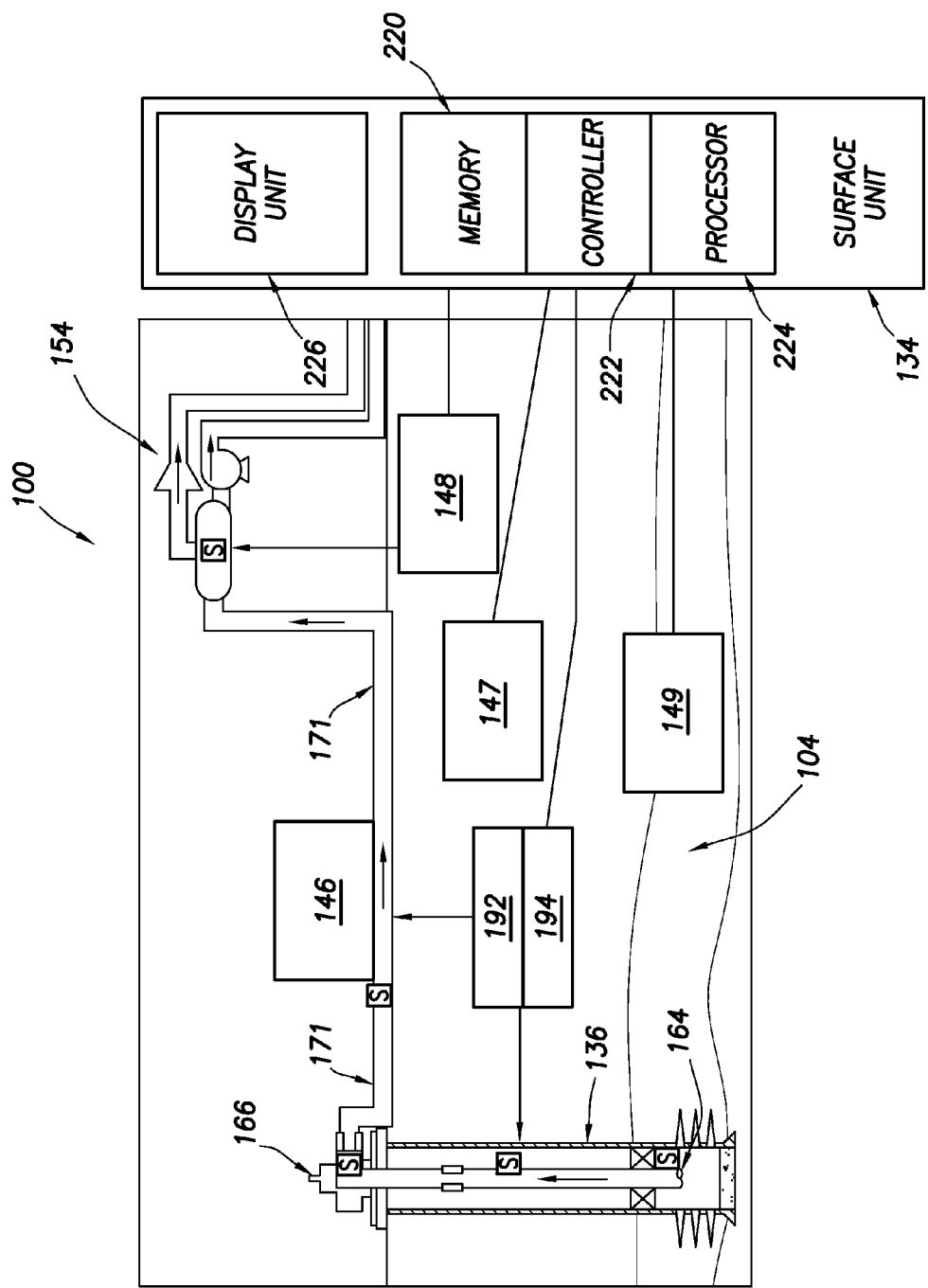
FIG. 2 shows a schematic view of a portion of the oilfield of FIGS. 1A-1D, depicting the wellsite and gathering network in detail.

FIG. 2 shows a schematic view of a portion of the oilfield (100) of FIGS. 1A-1D, depicting the wellsite and gathering network (146) in detail. The wellsite of FIG. 2 has a wellbore (136) extending into the earth therebelow. As shown, the wellbore (136) has already been drilled, completed, and prepared for production from reservoir (104).

Wellbore production equipment (164) extends from a wellhead (166) of wellsite and to the reservoir (104) to draw fluid to the surface. The wellsite is operatively connected to the gathering network (146) via a transport line (161). Fluid flows from the reservoir (104), through the wellbore (136), and onto the gathering network (146). The fluid then flows from the gathering network (146) to the process facilities (154).

As further shown in FIG. 2, sensors (S) are located about the oilfield (100) to monitor various parameters during oilfield operations. The sensors (S) may measure, for example, pressure, temperature, flow rate, composition, and other parameters of the reservoir, wellbore, gathering network, process facilities and other portions of the oilfield operation. These sensors (S) are operatively connected to a surface unit (134) for collecting data therefrom. The surface unit may be, for example, similar to the surface unit (134) of FIGS. 1A-D.

One or more surface units (e.g., surface unit (134)) may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user. The surface unit (134) is adapted to receive and store data. The surface unit (134) may also be equipped to communicate with various oilfield equipment. The surface unit (134) may then send command signals to the oilfield (100) in response to data received.

The surface unit (134) has computer facilities, such as memory (220), controller (222), processor (224), and display unit (226), for managing the data. The data is collected in memory (220), and processed by the processor (224) for analysis. Data may be collected from the oilfield sensors (S) and/or by other sources. For example, oilfield data may be supplemented by historical data collected from other operations, or user inputs.

The analyzed data may then be used to make decisions. A transceiver (not shown) may be provided to allow communications between the surface unit (134) and the oilfield (100). The controller (222) may be used to actuate mechanisms at the oilfield (100) via the transceiver and based on these decisions. In this manner, the oilfield (100) may be selectively adjusted based on the data collected. These adjustments may be made automatically based on computer protocol and/or manually by an operator. In some cases, well plans are adjusted to select optimum operating conditions, or to avoid problems.

A display unit (226) may be provided at the wellsite and/or remote locations for viewing oilfield data (not shown). The oilfield data represented by a display unit (226) may be raw data, processed data and/or data outputs generated from various data. The display unit (226) is preferably adapted to provide flexible views of the data, so that the screens depicted may be customized as desired. A user may determine the desired course of action during production based on reviewing the displayed oilfield data. The production operation may be selectively adjusted in response to the display unit (226). The display unit (226) may include a two dimensional display for viewing oilfield data or defining oilfield events. For example, the two dimensional display may correspond to an output from a printer, plot, a monitor, or another device configured to render two dimensional output. The display unit (226) may also include a three-dimensional display for viewing various aspects of the production operation. At least some aspect of the production operation is preferably viewed in real time in the three-dimensional display. For example, the three dimensional display may correspond to an output from a printer, plot, a monitor, or another device configured to render three dimensional output.

To facilitate the processing and analysis of data, simulators are typically used by the processor to process the data. Specific simulators are often used in connection with specific oilfield operations, such as reservoir or wellbore production. Data fed into the simulator(s) may be historical data, real time data or combinations thereof. Simulation through one or more of the simulators may be repeated or adjusted based on the data received.

As shown, the oilfield operation is provided with wellsite and non-wellsite simulators. The wellsite simulators may include a reservoir simulator (149), a wellbore simulator (192), and a surface network simulator (194). The reservoir simulator (149) solves for petroleum flow through the reservoir rock and into the wellbores. The wellbore simulator (192) and surface network simulator (194) solves for petroleum flow through the wellbore and the surface gathering network (146) of pipelines. As shown, some of the simulators may be separate or combined, depending on the available systems.

The non-wellsite simulators may include process and economics simulators. The processing unit has a process simulator (148). The process simulator (148) models the processing plant (e.g., the process facility (154)) where the petroleum is separated into its constituent components (e.g., methane, ethane, propane, etc.) and prepared for sales. The oilfield (100) is provided with an economics simulator (147). The economics simulator (147) models the costs of part or all of the oilfield (100). Various combinations of these and other oilfield simulators may be provided.

Figure 3:
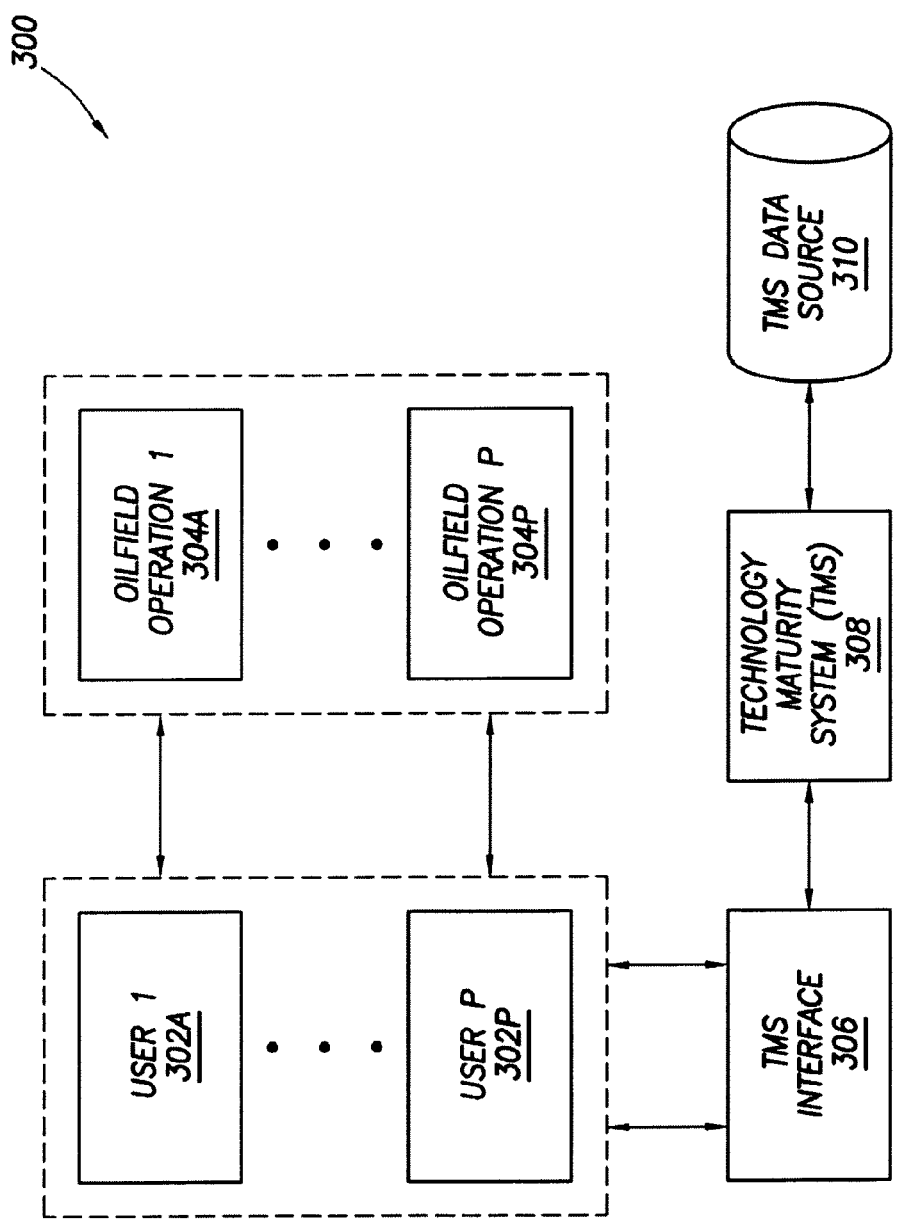
FIGS. 3-4 show systems for measuring technology maturity in accordance with one or more embodiments of the invention.

FIG. 3 shows a system for measuring technology maturity in accordance with one or more embodiments of the invention. The system (300) includes a technology maturity system (TMS) (308) interacting with a TMS data source (310) and a TMS interface (306). In one or more embodiments of the invention, the TMS interface (306) interacts with user(s) (302A, 302P). Further, the user(s) (302A, 302P) may further interact with oilfield operation(s) (304A, 304P). Each of the aforementioned components of FIG. 3 is described below.

In one or more embodiments of the invention, each of the user(s) (302A, 302P) may correspond to a specialist associated with a technology. More specifically, each of the user(s) (302A, 302P) may correspond to an operator of a technology in an oilfield operation (304A, 304P). Alternatively, each of the user(s) (302A, 302P) may correspond to a consumer associated with the oilfield operation (304A, 304P). For example, a consumer may correspond to a supervisor of an oilfield operation (304A, 304P). In this example, the supervisor may indirectly interact with a technology associated with the oilfield operation (e.g., viewing reports created using the technology, directing a specialist associated with the technology, etc.). Those skilled in the art will appreciate that a technology may correspond to a variety of devices or methods that are used in an oilfield operation (e.g., data collection, remote monitoring, diagnostics, remote operation, modeling tools, etc.).

In one or more embodiments of the invention, the user(s) (302A, 302P) may interact with oilfield operations (304A, 304P). An oilfield operation (304A, 304P) may correspond to a production operation, an exploration operation, or a drilling operation as described with respect to FIGS. 1A-1D. In one or more embodiments of the invention, the user(s) (302A, 302P) may use a variety of technologies to perform the oilfield operation(s) (304A, 304P). For example, a user 1 (302A, 302P) may perform remote operations of a drilling tool at a drilling operation of an oilfield.

In one or more embodiments of the invention, the user(s) (302A, 302P) may interact with the TMS Interface (306). For example, the user(s) (302A, 302P) may access the TMS Interface (306) over the Internet (or other Wide Area Network or Local Area Network) using a web browser (or other interface for communicating over a network). Alternatively, the user(s) (302A, 302P) may interact with the TMS Interface (306) using an application running natively on a user's (302A, 302P) local computer (not shown). Further, in one or more embodiments of the invention, the TMS Interface (306) may interact with the user(s) (302A, 302P) through use of notifications. The notifications may be conveyed by electronic mail, short message service (SMS), or some other form of electronic correspondence.

In one or more embodiments of the invention, the TMS interface (306) may be configured to present assessments of technology maturity to the user(s) (302A, 302P). For example, the TMS interface (306) may be configured to present an assessment of technology maturity to a user (302A, 302P) through a web browser. Alternatively, the TMS interface (306) may be configured to transmit an assessment of technology maturity to a user (302A, 302P) by electronic mail or some other form of electronic correspondence. In one or more embodiments of the invention, the TMS interface (306) may be further configured to receive assessment responses from the user(s) (302A, 302P). In this case, the TMS interface (306) may be configured to interact with the TMS (308) in order to process the assessment responses. More specifically, the TMS (308) may be configured to extract and store technology maturity information in the assessment responses. In one or more embodiments of the invention, the user(s) (302A, 302P) may submit assessment responses based on activities performed as part of an oilfield operation (304A, 304P).

Those skilled in the art will appreciate that technology maturity information may be obtained using an assessment by a variety of collection methods (e.g., physical surveys, email surveys, through a web interface, some other collection method, or some combination thereof).

Continuing with the discussion of FIG. 3, in one or more embodiments of the invention, the TMS interface (306) may be further configured to present technology maturity information to the user(s) (302A, 302P). For example, the TMS interface (306) may be configured to interact with the TMS Interface (306) to present technology maturity information to the user(s) (302A, 302P).

In one or more embodiments of the invention, the TMS (308) may be configured to store information in the TMS data source (310). In one or more embodiments of the invention, the TMS data source (310) is a data store (e.g., a database, a file system, one or more data structures configured in a memory, an extensible markup language (XML) file, some other medium for storing data, or any suitable combination thereof), which may include information (e.g., technology characteristics, adoption levels of capabilities, etc.) related to technologies.

In one or more embodiments of the invention, the TMS (308) may be configured to process assessment responses from user(s) (302A, 302P). More specifically, the TMS (308) may be configured to generate a technology maturity index based on the assessment responses. Further, the TMS (308) may be configured to use technology maturity indexes to measure the industry's adoption of technologies. More specifically, the TMS (308) may be configured to allow for structured measurement of progress in adopting capabilities, for comparison of the progress with business indicators, and for planning and measurement of the effectiveness of implementing the capabilities. For example, the system for measuring technology maturity may be configured to quantify capabilities associated with technologies and then compare capabilities across individual technology segments and within the segments across geographic areas.

In one or more embodiments of the invention, the technology maturity index may correspond to the adoption of technologies in an industry associated with the technologies. More specifically, the adoption of the technologies may be derived from adoption levels associated with a variety of capabilities associated with the technologies. Each capability may describe characteristics (e.g., amount of automation, monitoring, diagnostics, collaboration, etc.) of a corresponding technology. In one or more embodiments of the invention, the technology maturity index for an oilfield operation increases as the adoption level of capabilities increase for the oilfield operation. In this case, technology maturity index may describe the relative efficiency of an oilfield operations where the efficiency of the oilfield operation increases as capabilities are adopted at the oilfield operation. For example, an oilfield operation that has fully adopted each of the capabilities may be fully automated.

Examples of capabilities include, but are not limited to, data acquisition and transmission, monitoring activities, surveillance with warning capabilities, diagnostics and analysis, extended team and expertise, remote actuation and operation, model-centric diagnostics, global collaboration, model-based corrective action, and automation and autonomous action. Those skilled in the art will appreciate that any number of capabilities may be specified.

Those skilled in the art will appreciate that two or more of the capabilities may be cumulative. For example, the "monitoring activities at the well-site" capability may not be practiced until the "data acquisition and transmission from the wellsite" capability is adopted. In this example, an assessment may not allow the adoption level of the "monitoring activities at the well-site" capability to increase until the "data acquisition and transmission from the wellsite" capability is specified as fully adopted.

In one or more embodiments of the invention, the TMS (308) may be configured to quantify the adoption level of real-time capabilities and/or asynchronous capabilities. A real-time capability may be a capability that requires a response to an event by a deadline. For example, monitoring activities at a wellsite may be considered a real-time capability if information associated with the activities is provided simultaneously, or within a specified period of time, as the activities occur at the wellsite. An asynchronous capability may be a capability that does not require a response to an event by a deadline. For example, monitoring activities at a wellsite may be considered an asynchronous capability if the information associated with the activities is batched and provided based on a configurable schedule (e.g., hourly, daily, weekly, etc.).

In one or more embodiments of the invention, TMS (308) may be configured to generate a proactive action plan for implementing technologies to perform an oilfield operation. More specifically, the TMS (308) may be configured to generate the proactive action plan based on a target technology maturity index specified by user(s) (302A, 302P). The proactive action plan may account for the current adoption level of capabilities associated with the technologies in the oilfield operation, describing the relative efficiency of the oilfield operation. Further, the proactive action plan may accelerate the adoption of technologies in the oilfield operation. More specifically, the proactive action plan may allow for the adoption of technologies in the oilfield operation to be managed based on the adoption levels of the capabilities. The target technology maturity index may specify a target adoption level of capabilities. In this case, the proactive action plan may be configured to increase the adoption levels of capabilities until the target technology maturity index is achieved.

Those skilled in the art will appreciate that the proactive action plan may include a number of steps for increasing the adoption level of some of the capabilities. For example, a proactive action plan for a well production operation may include a step to increase the adoption of a model-based corrective action capability to a specific percentage (e.g., at least 75% adoption). Further, those skilled in the art will appreciate that the steps of the proactive action plan may be associated with any type of oilfield operation (e.g., well production operation, well construction operation, or some other oilfield operation). In one or more embodiments of the invention, once the proactive action plan has been defined, the proactive action plan (or some portion of the proactive action plan) may be implemented.

Figure 4:
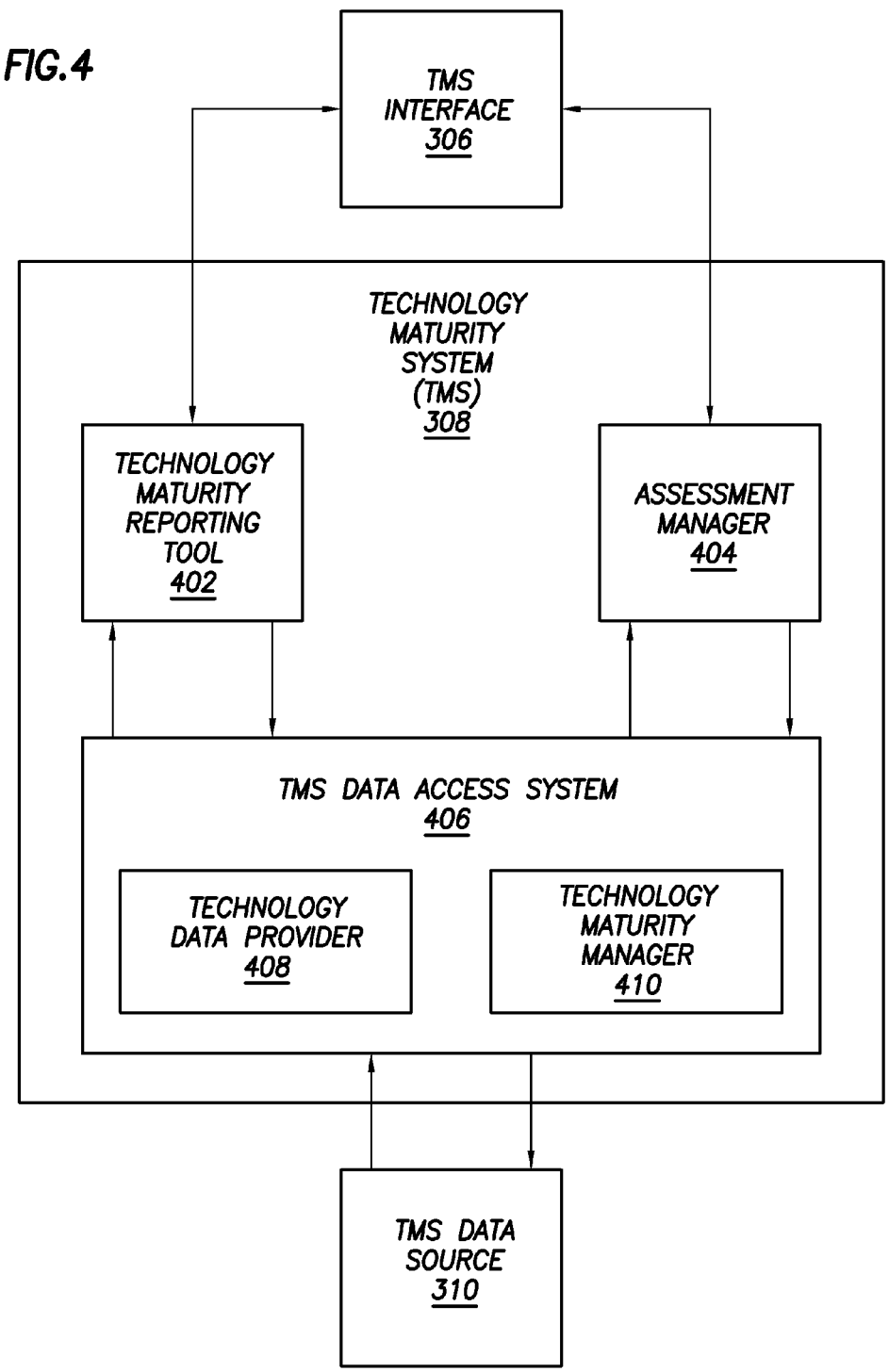

FIG. 4 shows a system for measuring technology maturity in accordance with one or more embodiments of the invention. The system includes a technology maturity system (TMS) (308) interacting with a TMS data source (310) and a TMS interface (306). In one or more embodiments of the invention, the TMS (308) further includes a TMS data access system (406) interacting with a technology maturity reporting tool (402) and an assessment manager (404). In one or more embodiments of the invention, the TMS data access system (406) further includes a technology data provider (408) and a technology maturity manager (410). Each of the aforementioned components of FIG. 4 is described below.

In one or more embodiments of the invention, the TMS interface (306) is configured to provide user(s) access to the TMS (308). More specifically, the TMS interface (306) may be configured to receive assessment responses from the user(s). Further, the TMS interface (306) may be configured to present technology maturity information to the user(s).

In one or more embodiments of the invention, the TMS interface (306) may interact with an assessment manager (404). More specifically, the assessment manager (404) may be configured to present an assessment to user(s) using the TMS Interface (306). For example, the assessment manager (404) may present an assessment, including requests for adoption levels of capabilities, to a user through a web browser. In one or more embodiments of the invention, an assessment may correspond to a survey related to the capabilities of an oilfield operation. For example, an assessment may include any number of inquiries related to the adoption levels of capabilities in an oilfield operation. In one or more embodiments of the invention, the inquiries may be answered by selecting yes or no. In this case, a number of inquiries may be used to ascertain the adoption level of a single capability. Alternatively, the inquiries may be answered by selecting a numerical value corresponding to the adoption level.

In one or more embodiments of the invention, the assessment manager (404) may be configured to process assessment responses from the user(s). For example, the assessment manager (404) may extract adoption levels for capabilities from the assessment responses. In this example, an adoption level may correspond to a numeric value (e.g., percentage, value on scale from 1 to 10, etc.). Those skilled in the art will appreciate that assessment responses may further include a variety of information associated with a technology (e.g., free-form comments, cost information, etc.).

In one or more embodiments of the invention, the TMS interface (306) may interact with a technology maturity reporting tool (402). More specifically, the technology maturity reporting tool (402) may be configured to present technology maturity information to the user(s) using the TMS interface (306). For example, the technology maturity reporting tool (402) may interact with the TMS data access system (406) to generate a technology maturity report. The technology maturity report may include graphical and/or textual representations of a technology maturity index of a technology. In one or more embodiments of the invention, the technology maturity index may be graphically represented as a combination of adoption levels of capabilities. For example, the valuation of each adoption level may be represented by a color (e.g., red representing low adoption, green representing high adoption, etc.). In this example, the technology maturity index may be represented as the sum of the adoption levels and similarly represented by a color. Alternatively, the adoption levels and technology maturity index may be represented by numerical values.

Those skilled in the art will appreciate that a technology maturity report may be associated with multiple technologies. Similarly, in this case, the technology maturity index of the technologies may be graphically represented and/or textually represented in a table.

In one or more embodiments of the invention, the technology maturity manager (410) may be configured to obtain technology maturity information. More specifically, the technology maturity manager (410) may be configured to obtain a technology maturity index based on assessment responses from user(s). For example, the technology maturity manager (410) may be configured to calculate a technology maturity index for a technology based on the adoption level of capabilities included in assessment responses associated with the technology. Further, the technology maturity index may be calculated based on the assessment responses from multiple users. Alternatively, the technology maturity manager (410) may be configured to obtain a technology maturity index based on assessment responses retrieved from the TMS data source (310). In this case, assessment responses associated with user(s) may be stored in the TMS data source (310).

In one or more embodiments of the invention, the technology data provider (408) may be configured to retrieve and store technology maturity information from the TMS data source (310). For example, the technology data provider (408) may be configured to retrieve technology maturity information for use by the technology maturity reporting tool (402). In this example, the technology data provider (408) may be configured to use the technology maturity manager (410) to obtain technology maturity indexes based on the technology maturity information.

Figure 5:
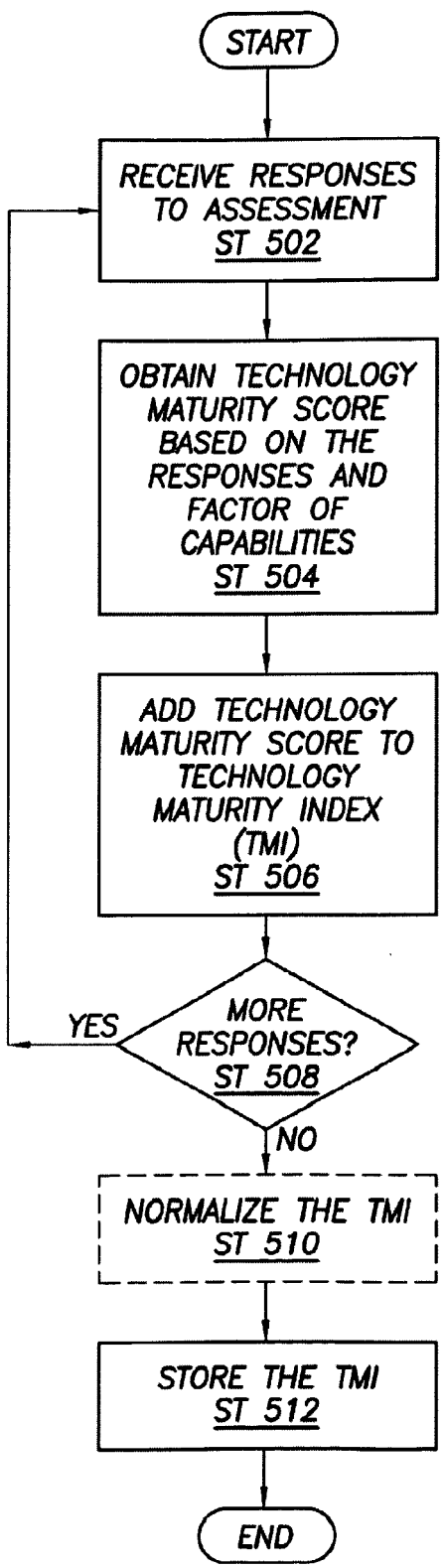
FIGS. 5-7 show flow charts for measuring technology maturity in accordance with one or more embodiments of the invention.

FIG. 5 shows a flow chart for measuring technology maturity in accordance with one or more embodiments of the invention. Specifically, FIG. 5 shows a flow chart for obtaining a technology maturity index (TMI). In one or more embodiments of the invention, one or more of the steps described below may be omitted, repeated, and/or performed in a different order. Accordingly, the specific arrangement of steps shown in FIG. 5 should not be construed as limiting the scope of the invention.

In ST 502, responses to an assessment of technology maturity are received. In one or more embodiments of the invention, each response may specify an adoption level of a capability of the technology. Those skilled in the art will appreciate that each response may further specify a variety of information associated with the technology (e.g., relevant component of the technology, capability comments related to the technology, etc.). In one or more embodiments of the invention, the responses may be submitted by the user using a user interface (e.g., web browser, application running natively on the user's machine, etc.). Alternatively, the responses may be submitted by the user using some form of electronic correspondence (e.g., electronic mail, short message service, etc.)

Next, a technology maturity score may be obtained based on the responses (ST 504). Those skilled in the art will appreciate that the technology maturity score may be calculated using a variety of formulas (e.g., summation, product, average, etc.). In one or more embodiments of the invention, the technology maturity score may be calculated based on numerical values associated with each of the responses. For example, the technology maturity score may correspond to a weighted summation of the numerical values associated with the responses. In this example, each response may be weighted by a factor based on the capability associated with the response. Those skilled in the art will appreciate that each factor may be determined based on a variety of information (e.g. extent of automation of the capability, difficulty of implementing the capability, sequential order of typical implementation of the capability, and/or some other information associated with the capability).

In one or more embodiments of the invention, the responses to the assessment may correspond to adoption levels including, but not limited to, the following: infrequently or rarely practiced, occasionally practiced, and systematically practiced. In this case, each response may be associated with a numerical value as discussed above based on the adoption level (e.g., 0—infrequently or rarely practiced, 1—occasionally practiced, 2—systematically practiced).

The technology maturity score may then be incorporated into a technology maturity index (TMI) (ST 506). In one or more embodiments of the invention, the TMI may correspond to the average of a number of technology maturity scores. In this case, the technology maturity scores received in response to the assessment may be averaged to calculate the TMI.

At this stage, a determination may be made as to whether more responses to the assessment have been received (ST 508). In one or more embodiments of the invention, responses to the assessment may be received from a number of users. Those skilled in the art will appreciate that the responses may be received by a variety of methods (e.g., electronic mail, web application interface, advanced program interface, etc.). In one or more embodiments of the invention, the TMI may be updated as the responses to the assessments are received. Alternatively, the TMI may be calculated based on a schedule (i.e., allowing a certain period of time for responses to be received) and/or after a certain number of responses are received. For example, the TMI may be calculated after responses to the assessment are received from all the users that received the assessment. In another example, the TMI may be calculated after responses to the assessment are received from a percentage (e.g., 50 percent, 75 percent, etc.) of the users that received the assessment.

Optionally, the TMI may be normalized (ST 510). In one or more embodiments of the invention, the TMI calculated in ST 506 may be based on an abnormal numerical range (e.g., 0 to 110, 0 to 22, etc.). In this case, the TMI may be normalized to convert the TMI to a standard numerical range. For example, a TMI based on an abnormal numerical range may be normalized to range from 0 to 100. In this example, the TMI may be normalized to range from 0 to 100 using the following formula:

$$\frac{\sum_{n=1}^{10} n \times S(n)}{1.10},$$

where S(n) is the factor of each capability, ten capabilities are used to calculated the TMI, and the abnormal numerical range is 0 to 110.

The TMI may be stored in a data source (ST 512). Those skilled in the art will appreciate that a variety of information related to the TMI may also be stored (e.g., responses to the assessment, user information, capability information, etc.).

Figure 6:
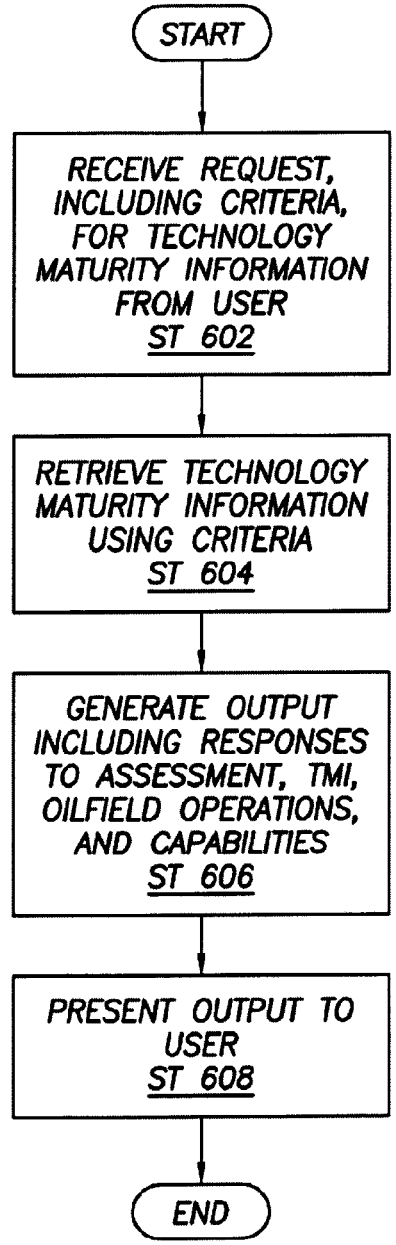

FIG. 6 shows a flow chart for measuring technology maturity in accordance with one or more embodiments of the invention. Specifically, FIG. 6 shows a flow chart for presenting technology maturity information. In one or more embodiments of the invention, one or more of the steps described below may be omitted, repeated, and/or performed in a different order. Accordingly, the specific arrangement of steps shown in FIG. 6 should not be construed as limiting the scope of the invention.

In ST 602, a request for technology maturity information may be received from a user. In one or more embodiments of the invention, the request may include criteria selected by the user. For example, the criteria may specify that only technology information associated with a specific business unit should be retrieved. Those skilled in the art will appreciate that any number of criteria may be specified related to a variety of attributes (e.g., business unit, technology area, geographic region, etc.).

In response to receiving the request, technology maturity information may be retrieved (ST 604). In one or more embodiments of the invention, the technology maturity information may be retrieved using criteria specified by the user. Those skilled in the art will appreciate that the technology maturity information may include a variety of information related to the technology (e.g. technology information, capability information, technology maturity index (TMI), responses to assessments, or some other information associated with technology maturity).

At this stage, output may be generated using the technology maturity information (ST 606). In one or more embodiments of the invention, the output may be generated in a tabular format. Those skilled in the art will appreciate that the technology maturity information included in the tabular format may be filtered by a variety of attributes (e.g. oilfield operation, geographic region, date and/or time, business group, area of technology, TMI value, or some other attribute). For example, the tabular format may include the technology maturity information associated with a group of oilfield operations. In another example, the tabular format may include the technology maturity information associated with an oilfield operation at multiple time intervals. In another example, the tabular format may include technology maturity information associated an oilfield operation in a geographic region. In another example, the tabular format may include technology maturity information associated with a single oilfield operation.

Alternatively, in one or more embodiments of the invention, the output may be generated in a graphical format. For example, the graphical format may depict a map of geographical regions displaying technology maturity information on a geographic-region basis. Further, in one or more embodiments of the invention, the graphical format may allow the user to restrict the technology maturity information displayed to a specific graphical region including more detailed technology maturity information. For example, the graphical format may depict a map of geographical regions that allow the user select a geographic region in order to view technology maturity information associated with sub-regions associated with the geographic region. Alternatively, the graphical format may allow the user to view the tabular format of the technology maturity information associated with a selected geographic region. In another example, the graphical format may depict a three-dimensional representation of technology maturity information based on a variety of characteristics (e.g., capabilities, oilfield operations, geographic regions, business units, technology area, etc.). In this case, each axis of the three-dimensional representation may correspond to one of the aforementioned characteristics.

Next, the output may be presented to the user (ST 608). Those skilled in the art will appreciate that presenting of the technology maturity information may allow for comparison between different oilfield operations. For example, the adoption level of the "model-based corrective action" capability may be presented as systematically practiced at a first oilfield operation and rarely practiced at a second oilfield operation. In this example, the user may allocate resources between the oilfield operations based on a comparison of the capabilities of the oilfield operations.

Figure 7:
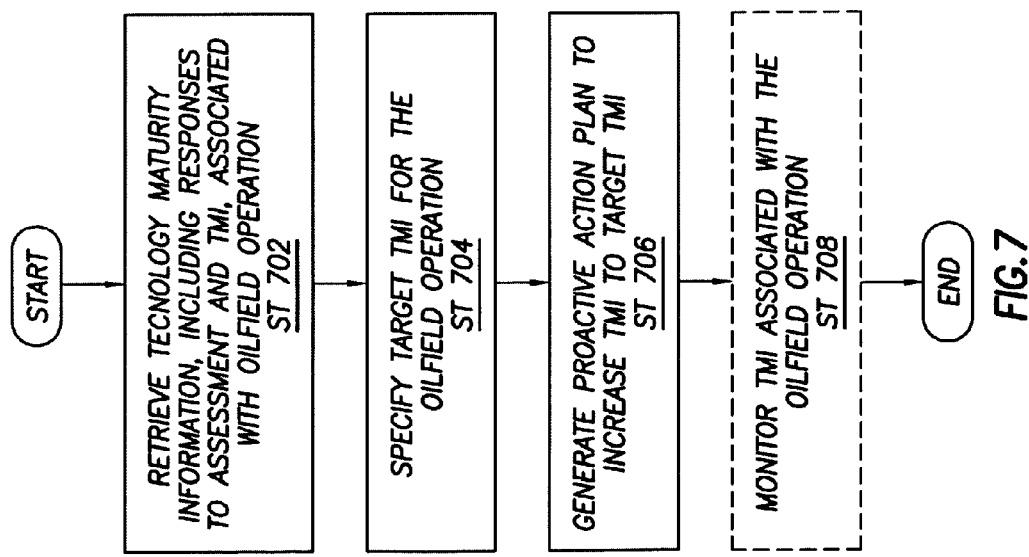

FIG. 7 shows a flow chart for measuring technology maturity in accordance with one or more embodiments of the invention. Specifically, FIG. 7 shows a flow chart for generating a proactive action plan. In one or more embodiments of the invention, one or more of the steps described below may be omitted, repeated, and/or performed in a different order. Accordingly, the specific arrangement of steps shown in FIG. 7 should not be construed as limiting the scope of the invention.

In ST 702, technology maturity information associated with an oilfield operation may be obtained. Those skilled in the art will appreciate that a variety of information associated with technology maturity may be obtained (e.g. technology information, capability information, technology maturity index (TMI), responses to assessments, or some other information associated with technology maturity). For example, technology maturity information may be obtained as described with respect to FIG. 6. In one or more embodiments of the invention, the oilfield operation may correspond to production operation(s), exploration operation(s), and/or drilling operation(s).

At this stage, a target TMI may be specified for the oilfield operation (ST 704). In one or more embodiments of the invention, the target TMI may correspond to a target adoption level of technological capabilities. For example, the target TMI may specify target adoption levels for capabilities (e.g., monitoring activities, surveillance with warning capabilities, diagnostics and analysis, extended team and expertise, etc.) in an oilfield operation.

Those skilled in the art will appreciate that the target TMI and adoption levels for capabilities may be specified based on a variety of considerations. For example, the target TMI and adoption levels may be specified based on the requirements of the company associated with the oilfield operation. In another example, the target TMI and adoption levels may be specified based on assessments of oilfield operations performed by competing companies. In this example, a competing TMI for an oilfield operation of a competing company may be calculated and then used to specify the target TMI and adoption levels for the proactive action plan.

The proactive action plan to increase the TMI to the target TMI may be generated (ST 706). In one or more embodiments of the invention, the proactive action plan may specify steps for achieving target adoption levels for each of the capabilities in order to increase the TMI to the target TMI. For example, the proactive action plan may specify that the ability to operate a drilling bit from a remote location must be adopted in order to reach the target TMI.

Optionally, the TMI associated with the oilfield operation may be monitored (ST 708). In one or more embodiments of the invention, the TMI may be monitored for changes in the TMI. In this case, the proactive action plan may be modified based on the changes to the TMI. For example, a step of the proactive action plan may be removed once a certain TMI has been reached. Those skilled in the art will appreciate that other information associated with technology maturity may be monitored (e.g., capability information, technology information, etc.). For example, a step of the proactive plan may be associated with an alternate capability if the cost associated with the original capability increases past a threshold.

The following is an example of a progressive adoption of capabilities for an oilfield operation as described with respect to FIGS. 3-5. Those skilled in the art will appreciate that the following example is provided for exemplary purposes only and accordingly should not be construed as limiting the scope of the invention. Any portion of the progressive adoption of capabilities may correspond to the implementation of a proactive action plan as described with respect to FIGS. 3 and 6.

Specifically, the example shows the progressive adoption of adopted processes in a well construction operation, where each adopted process is followed by the capability corresponding to the adopted process:

1. A process is adopted providing functionality to collect drill bit depth information at the wellsite and transmit the drill bit depth information to users via the Internet (i.e., data acquisition and transmission).

2. A process is adopted providing functionality to make a variety of well-site information, including drill bit depth, surface measurements, seismic data, and downhole measurements, available via the Internet in real-time (i.e., monitoring activities in real-time).

3. A process is adopted providing functionality to monitor well-site information in real-time and to notify offsite personal of unexpected events, such as a damaged drill bit, or of any deviations from preset norms (i.e., surveillance with early warning capability).

4. A process is adopted providing functionality to predict the time of completion of the well, based on real-time drill bit depth information, equipment performance, seismic data, and other downhole measurements, to be delivered via the Internet (i.e., diagnostics and analysis).

5. A process is adopted providing functionality to enable real-time diagnostics of wellbore information to a group of remote specialists, who are able to participate in decisions regarding the well construction (i.e., extended team and expertise beyond the wellsite).

6. A process is adopted providing functionality to allow a remote operator to steer the drill bit remotely (i.e., remote actuation and operation).

7. A process is adopted providing functionality to compare real-time wellbore diagnostics to a geologic model and notify a remote specialist if the diagnostics do not match expectations of the geologic model (i.e., model-centric diagnostics).

8. A process is adopted providing functionality to engage offsite team members if, for example, the drill bit becomes damaged (i.e., global collaboration).

9. A process is adopted providing functionality to monitor real-time diagnostics based on a drilling mechanisms model may automatically adjust drilling parameters to minimize vibration of downhole tools while drilling the well, including receiving authorization from a remote specialist to commit the adjustment of the drilling parameters (i.e., model-based corrective action).

10. A process is adopted providing functionality to autonomously direct the trajectory of a drill bit based on a preset model (i.e., automation and autonomous action).

In this example, the technology maturity index of the well construction operation increases as each of the processes is adopted. Assuming that all the processes are systematically practiced, the well construction operation may now have the highest technology maturity index because each of the required capabilities has been adopted in the processes.

In another example, the current technology maturity index of a well construction operation that has not fully adopted each process may be obtained based on the factors and adoption level of the capability corresponding to each process. The following table specifies adoption levels of each capability for the well construction operation:

TABLE 1

Adoption Levels for Well Construction Operation

| Capability Level/Factor | Capability | Adoption Level |
|---|---|---|
| 10 | Automation and autonomous action | 0 |
| 9 | Model-based corrective action | 0 |
| 8 | Global collaboration | 0 |
| 7 | Model-centric diagnostics | 0 |
| 6 | Remote actuation and operation | 1 |
| 5 | Extended team and expertise | 1 |
| 4 | Diagnostics and analysis | 2 |
| 3 | Surveillance with early warning capability | 2 |
| 2 | Monitoring activities in real-time | 2 |
| 1 | Data acquisition and transmission | 2 |

The adoptions levels included in Table 1 specify that (1) the processes corresponding to capability levels 1-4 are systematically practiced at the well construction operation; (2) the processes corresponding to capability levels 5-6 are occasionally practiced at the well construction operation; and (3) the processes corresponding to capability levels 7-10 are infrequently or rarely practiced at the well construction operation.

Using the values included in Table 1, the technology maturity index may be calculated as discussed with respect to FIG. 5. Initially, the weighted summation of the adoption levels of the capabilities is calculated as 31. The weighted summation is then normalized to a value of 28, on a scale of 0 to 100, to obtain the technology maturity index, where the maximum weighted summation for the adoption levels is 110.

At this stage, the technology maturity index may be evaluated in comparison to a target technology maturity index. More specifically, a proactive action plan may be generated to increase the technology maturity index to the target technology maturity index. The following table (Table 2) shows adoption levels and technology maturity indexes for a current well construction operation compared to an exemplary proactive action plan:

TABLE 2

Technology Maturity Indexes including Proactive Action Plan

| Capability Level/Factor | Capability | Current Adoption Levels | Proactive Action Plan |
|---|---|---|---|
| 10 | Automation and autonomous action | 0 | 0 |
| 9 | Model-based corrective action | 0 | 0 |
| 8 | Global collaboration | 0 | 1 |
| 7 | Model-centric diagnostics | 0 | 1 |
| 6 | Remote actuation and operation | 1 | 1 |
| 5 | Extended team and expertise | 1 | 2 |
| 4 | Diagnostics and analysis | 2 | 2 |
| 3 | Surveillance with early warning capability | 2 | 2 |
| 2 | Monitoring activities in real-time | 2 | 2 |
| 1 | Data acquisition and transmission | 2 | 2 |
|  | Technology Maturity Index: | 28 | 46 |

The proactive action plan of Table 2 specifies capabilities that require an increase in adoption level in order to achieve the target technology maturity index. More specifically, the adoption levels for the proactive action plan of Table 2 specify that the processes corresponding to capability level 7 (i.e., model-centric diagnostics) and capability level 8 (i.e., global collaboration) should be increased to occasionally practiced and that the process corresponding to capability level 5 (i.e., extended team and expertise) should be increased from occasionally practices to systematically practiced. In this case, the implementation of the proactive action plan would increase the technology maturity index of the well construction operation to 46.

In another case, the technology maturity index may be compared to the technology maturity index of other well construction operations. For example, technology maturity indexes may be compared based on the geographic region of the well construction operations. The following table (Table 3) shows adoption levels and technology maturity indexes for well construction operations in multiple geographic areas:

TABLE 3

Technology Maturity Indexes for Geographic Areas

| Capability Level/Factor | Capability | Area A Adoption Level | Area B Adoption Level |
|---|---|---|---|
| 10 | Automation and autonomous action | 0 | 0 |
| 9 | Model-based corrective action | 0 | 0 |
| 8 | Global collaboration | 0 | 0 |
| 7 | Model-centric diagnostics | 0 | 1 |
| 6 | Remote actuation and operation | 1 | 2 |
| 5 | Extended team and expertise | 1 | 0 |
| 4 | Diagnostics and analysis | 2 | 2 |
| 3 | Surveillance with early warning capability | 2 | 1 |
| 2 | Monitoring activities in real-time | 2 | 2 |
| 1 | Data acquisition and transmission | 2 | 2 |
|  | Technology Maturity Index: | 28 | 33 |

The technology maturity indexes of Table 3 may be used to compare the technology maturity of Area A and Area B. More specifically, the values of Table 3 may be used to efficiently allocate resources between both areas.

The following is an example of a progressive adoption of capabilities for an oilfield operation as described with respect to FIGS. 3-5. Those skilled in the art will appreciate that the following example is provided for exemplary purposes only and accordingly should not be construed as limiting the scope of the invention. Any portion of the progressive adoption of capabilities may correspond to the implementation of a proactive action plan as described with respect to FIGS. 3 and 6. Specifically, the example shows the progressive adoption of adopted processes in a well production operation, where each adopted process is followed by the capability corresponding to the adopted process:

1. A process is adopted providing functionality to collect multiphase flow information at the wellsite and transmit the multiphase flow information to users via the Internet (data acquisition and transmission).
2. A process is adopted providing functionality to make a variety of well-site information, multiphase flow information, equipment performance, distributed temperature measurements, available via the Internet in real-time (monitoring activities as they occur).
3. A process is adopted providing functionality to monitor well-site information in real-time and to notify offsite personal of unexpected events, such as an unexpected change in the multiphase flow, or of any deviations from preset norms (surveillance with early warning capability).
4. A process is adopted providing functionality to measure the production of the well, based on real-time multiphase flow information, equipment performance, downhole circulating pressure, and other downhole measurements, to be delivered via the Internet (diagnostics and analysis).
5. A process is adopted providing functionality to enable real-time diagnostics of downhole and surface measurements to a group of remote specialists, who are able to participate in decisions regarding the well production (extended team and expertise).

6. A process is adopted providing functionality to allow a remote operator to shut off production from one interval of the well and increase production from another interval of the well (remote actuation and operation).

In this example, the technology maturity index of the well production operation increases as each of the processes is adopted. The well production operation may now be calculated based on the factors and the adoption level of the capabilities adopted on the processes.

FIG. 8 depicts a graphical user interface (GUI) in accordance with one embodiment of the invention. More specifically, the example depicts an assessment (800) as described above with respect to FIGS. 3 and 5. Those skilled in the art will appreciate that the following example is provided for exemplary purposes only and accordingly should not be construed as limiting the scope of the invention.

The assessment (800) includes a list of geographic regions (802) for the user to specify a geographic region for the assessment (800). The selected geographic region may be used to categorize data associated with the assessment to allow technology maturity indexes to be compared on a geographic-region basis. The assessment (800) further includes a list of oilfield operations (804) for the user to specify an oilfield operation for the assessment (800). The oilfield operations may correspond to, for example, production operations, exploration operations, and/or drilling operations as described with respect to FIGS. 1A-1D. The selected oilfield operation may be used to categorize the data associated with the assessment to allow technology maturity indexes to be compared between different oilfield operations.

The assessment (800) further includes a listing of capabilities (806). The assessment (800) allows the user to specify a level of adoption (808) for each capability. Each specified level of adoption may correspond to a response to the assessment (800) as discussed above with respect to FIG. 5. Once the user has specified a level of adoption (808) for each capability, the user may submit the responses to the assessment (800) via a submit button (810). At this stage, the responses to the assessment (800) may be received by a technology maturity system as described in ST 502 of FIG. 5.

Figure 9:
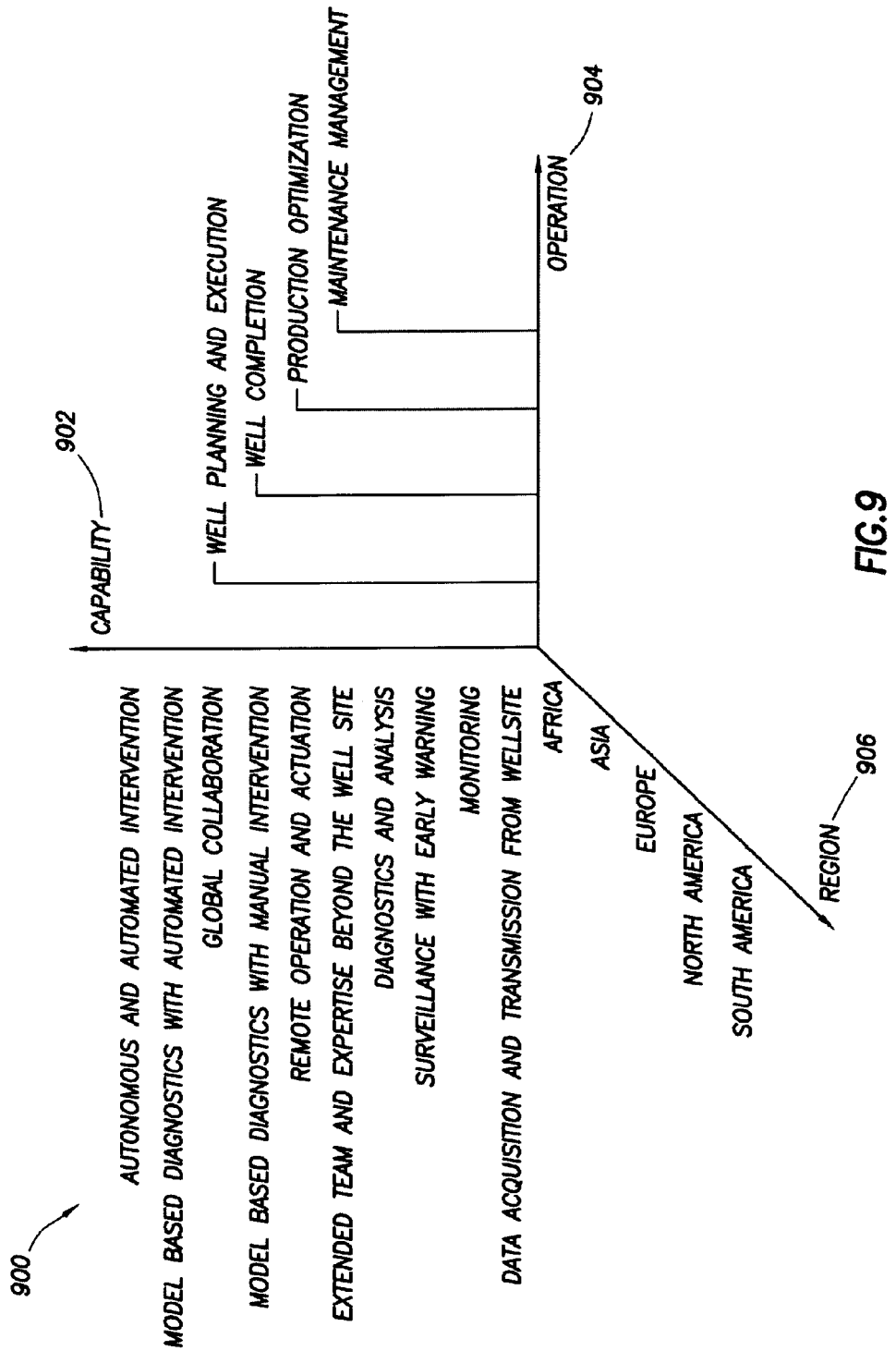
FIG. 9 shows an exemplary output of technology maturity in accordance with one or more embodiments of the invention.

FIG. 9 depicts an exemplary output of technology maturity in accordance with one embodiment of the invention. More specifically, the example depicts a three-dimensional output (900) as described above with respect to FIG. 6. Those skilled in the art will appreciate that the following example is provided for exemplary purposes only and accordingly should not be construed as limiting the scope of the invention.

The three-dimensional output (900) includes three axes corresponding to three characteristics (e.g., capabilities, oilfield operations, geographic regions, business units, technology area, etc.) for presenting technology maturity. In this example, the three-dimensional output (900) includes an axis corresponding to the capabilities (902) used for calculating technology maturity, an axis corresponding to the operations (i.e., oilfield operations) (904) of the technology maturity, and an axis corresponding to the geographic regions (906) of the technology maturity. The three-dimensional output (900) may present technology maturity indexes (not shown) associated with specific operations (904) and geographic regions (906). Further, the presentation of a technology maturity index (not shown) for a specific operation (904) and geographic region (906) may show the adoption levels of each of the capabilities (902). The three-dimensional output (900) may be used to efficiently allocate resources between the various operations (902) and geographic regions (904) included in the three-dimensional output (900).

Those skilled in the art will appreciate that output in a tabular format may be generated to include similar information as the three-dimensional output (900). In this case, one of the axes of the three-dimensional output (900) is not included in order to allow the information to be presented in a two-dimensional tabular format as shown in the following table (Table 4):

TABLE 4

Technology Maturity Indexes in Tabular Format

| Operation | Africa | Asia | Europe | Netherlands | Norway | North America | South America |
|---|---|---|---|---|---|---|---|
| Well Planning and Execution | 21 | 42 | 45 | 40 | 50 | 45 | 32 |
| Well Completion | 24 | 36 | 56 | 43 | 60 | 35 | 25 |
| Production Optimization | 32 | 33 | 23 | 15 | 35 | 23 | 35 |
| Maintenance Management | 15 | 21 | 35 | 45 | 25 | 35 | 45 |

The technology maturity indexes of Table 4 may be used to compare the technology maturity of numerous operations and geographic regions. Further, the geographic regions included in a tabular format may be of a variety of granularities (e.g., continent, country, county, state, etc.). For example, Table 4 includes five continents as well as nested countries for the continent of Europe. Those skilled in the art will appreciate that output in a tabular format as shown in Table 4 may include any number of geographic regions.

The values of Table 4 may be used to efficiently allocate resources between the operations and geographic regions included in Table 4. For example, the values for technology maturity in Europe may be compared to the technology maturity in other continents in order to determine whether resources should be allocated to specific countries in Europe.

Those skilled in the art will appreciate that output including a map of geographic regions may be generated to include similar information as the three-dimensional output (900). In this case, each geographic region (e.g., continent, country, county, state, etc.) may be depicted such that the technological maturity of the geographic region is represented. For example, each geographic may be depicted in a particular color specifying a technology maturity index.

Figure 10:
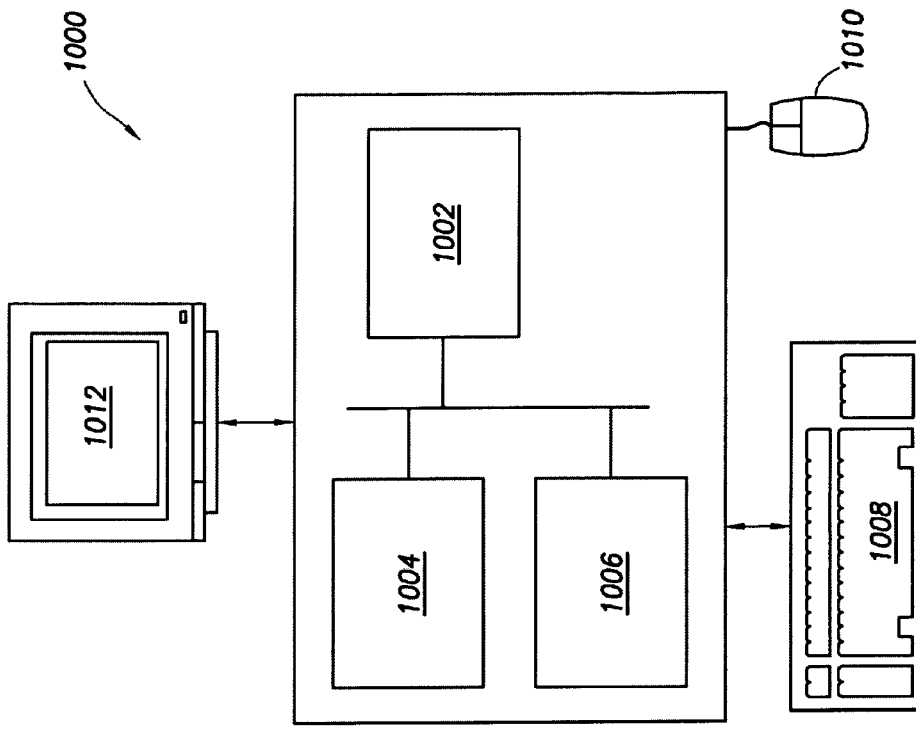
FIG. 10 shows a computer system in accordance with one or more embodiments of the invention.

The invention may be implemented on virtually any type of computer regardless of the platform being used. For example, as shown in FIG. 10, a networked computer system (1000) includes a processor (1002), associated memory (1004), a storage device (1006), and numerous other elements and functionalities typical of today's computers (not shown). The networked computer (1000) may also include input means, such as a keyboard (1008) and a mouse (1010), and output means, such as a monitor (1012). The networked computer system (1000) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (1000) may be located at a remote location and connected to the other elements over a network.

Further, those skilled in the art will appreciate that one or more elements of the aforementioned computer system (1000) may be located at a remote location and connected to the other elements over a network. Further, the invention may be implemented on a distributed system having a plurality of nodes, where each portion of the invention (e.g., assessment manager, TMS data source, TMS data access system, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring technical maturity index (TMI) for oilfield operations of an oilfield, the oilfield having a subterranean formation with geological structures and reservoirs therein, comprising:
    sending, to at least one user associated with an oilfield operation, an assessment comprising a plurality of iteratively defined capabilities for performing the oilfield operation for a wellsite, wherein the plurality of iteratively defined capabilities comprise a first capability to perform a task of the oilfield operation for the wellsite, a second capability to practice the first capability in real-time, a third capability to practice the second capability from a remote location from the wellsite, a fourth capability to practice the third capability for performing diagnostics of the oilfield operation for the wellsite, and a fifth capability to practice the fourth capability by multiple users, and wherein the plurality of iteratively defined capabilities comprise data acquisition and transmission from the wellsite, monitoring activities as they happen at the wellsite, surveillance with early warning capability, diagnostics and analysis, extended team and expertise beyond the wellsite, remote actuation and operation, model-centric diagnostics, global collaboration, model-based corrective action, and automation and autonomous action;
    receiving, in response to the assessment for the oilfield operation, a plurality of responses comprising a first level of adoption, a second level of adoption, a third level of adoption, and a fourth level of adoption, wherein the first level of adoption represents how frequent the first capability is practiced for the oilfield operation, the second level of adoption represents how frequent the second capability is practiced for the oilfield operation, the third level of adoption represents how frequent the third capability is practiced for the oilfield operation, and the fourth level of adoption represents how frequent the fourth capability is practiced for the oilfield operation;
    comparing a level of adoption corresponding to one of the plurality of iteratively defined capabilities with a corresponding goal level of adoption for the one of the plurality of iteratively defined capabilities;
    calculating, by a computer processor, a plurality of technology maturity scores by calculating a weighted summation for each adoption level in the plurality of responses;
    aggregating, by the computer processor, the first level of adoption, the second level of adoption, the third level of adoption, and the fourth level of adoption into a TMI for the oilfield operation using the plurality of responses, wherein the TMI is an average of the plurality of technology maturity scores and represents a single measure of adoption of the plurality of iteratively defined capabilities for the oilfield operation; and
    presenting the TMI for the oilfield operation.

2. The method of claim 1, further comprising:
    specifying a target TMI for the oilfield operation; and
    generating a proactive action plan to decrease the difference between the TMI for the oilfield operation and the target TMI for the oilfield operation, wherein the proactive action plan comprises at least one step for adjusting the oilfield operation.

3. The method of claim 2, further comprising:
    implementing the at least one step of the proactive action plan for the oilfield operation.

4. The method of claim 2, wherein the at least one step increases a level of adoption corresponding to one of the plurality of iteratively defined capabilities.

5. The method of claim 1, further comprising:
    tracking a level of adoption corresponding to at least one of the plurality of iteratively defined capabilities over a period of time.

6. The method of claim 1, further comprising:
    normalizing the TMI for the oilfield operation to a number ranging from 0 to 100.

7. The method of claim 1, wherein the weighted summation is based on a relative importance of the plurality of iteratively defined capabilities to the TMI for the oilfield operation.

8. The method of claim 1, wherein at least one of the plurality of iteratively defined capabilities describes one of a group consisting of real-time functionality and asynchronous functionality.

9. The method of claim 1, wherein the plurality of responses originates from the at least one user, wherein the at least one user is a specialist of the oilfield operation.

10. A system for measuring technical maturity index (TMI) for oilfield operations of an oilfield, the oilfield having a subterranean formation with geological structures and reservoirs therein, comprising:
    a computer processor;
    an assessment manager executing on the computer processor and configured to:
        send, to at least one user associated with an oilfield operation, an assessment comprising a plurality of iteratively defined capabilities for performing the oilfield operation for a wellsite, wherein the plurality of iteratively defined capabilities comprise a first capability to perform a task of the oilfield operation for the wellsite, a second capability to practice the first capability in real-time, a third capability to practice the second capability from a remote location from the wellsite, a fourth capability to practice the third capability for performing diagnostics of the oilfield operation for the wellsite, and a fifth capability to practice the fourth capability by multiple users, and wherein the plurality of iteratively defined capabilities comprise data acquisition and transmission from the wellsite, monitoring activities as they happen at the wellsite, surveillance with early warning capability, diagnostics and analysis, extended team and expertise beyond the wellsite, remote actuation and operation, model-centric diagnostics, global collaboration, model-based corrective action, and automation and autonomous action, and receive, in response to the assessment for the oilfield operation, a plurality of responses comprising a first level of adoption, a second level of adoption, a third level of adoption, and a fourth level of adoption, wherein the first level of adoption represents how frequent the first capability is practiced for the oilfield operation, the second level of adoption represents how frequent the second capability is practiced for the oilfield operation, the third level of adoption represents how frequent the third capability is practiced for the oilfield operation, and the fourth level of adoption represents how frequent the fourth capability is practiced for the oilfield operation;

a technology maturity manager executing on the computer processor and configured to:
  calculating a plurality of technology maturity scores by calculating a weighted summation for each adoption level in the plurality of responses; and
  aggregate the first level of adoption, the second level of adoption, the third level of adoption, and the fourth level of adoption into a TMI for the oilfield operation using the plurality of responses, wherein the TMI is an average of the plurality of technology maturity scores and represents a single measure of adoption of the plurality of iteratively defined capabilities for the oilfield operation; and a technology maturity reporting tool, executing on the computer processor, operatively connected to the assessment manager and the technology maturity manager and configured to
  compare a level of adoption corresponding to one of the plurality of iteratively defined capabilities with a corresponding goal level of adoption for the one of the plurality of iteratively defined capabilities, and
  present the TMI for the oilfield operation.

11. The system of claim 10, wherein the technology maturity reporting tool is further configured to:
  specify a target TMI for the oilfield operation, and
  generate a proactive action plan to decrease the difference between the TMI for the oilfield operation and the target TMI for the oilfield operation, wherein the proactive action plan comprises at least one step for adjusting the oilfield operation.

12. The system of claim 11, wherein the at least one step of the proactive action plan is implemented for the oilfield operation.

13. The system of claim 11, wherein the at least one step increases a level of adoption corresponding to one of the plurality of iteratively defined capabilities.

14. The system of claim 10, wherein the technology maturity reporting tool is further configured to track a level of adoption corresponding to at least one of the plurality of iteratively defined capabilities over a period of time.

15. The system of claim 10, wherein the technology maturity manager is further configured to normalize the TMI for the oilfield operation to a number ranging from 0 to 100.

16. The system of claim 10, wherein the weighted summation is based on a relative importance of the plurality of capabilities to the TMI for the oilfield operation.

17. The system of claim 10, wherein at least one of the plurality of iteratively defined capabilities describes one of a group consisting of real-time functionality and asynchronous functionality.

18. The system of claim 10, wherein the plurality of responses originates from the at least one user, wherein the at least one user is a specialist of the oilfield operation.

19. A non-transitory computer readable medium comprising computer program code embodied therein for causing a computer system to measure technical maturity index (TMI) for oilfield operations of an oilfield, the oilfield having a subterranean formation with geological structures and reservoirs therein, the computer program code comprising program instructions to:
  send, to at least one user associated with an oilfield operation, an assessment comprising a plurality of iteratively defined capabilities for performing the oilfield operation for a wellsite, wherein the plurality of iteratively defined capabilities comprise a first capability to perform a task of the oilfield operation for the wellsite, a second capability to practice the first capability in real-time, a third capability to practice the second capability from a remote location from the wellsite, a fourth capability to practice the third capability for performing diagnostics of the oilfield operation for the wellsite, and a fifth capability to practice the fourth capability by multiple users, and wherein the plurality of iteratively defined capabilities comprise data acquisition and transmission from the wellsite, monitoring activities as they happen at the wellsite, surveillance with early warning capability, diagnostics and analysis, extended team and expertise beyond the wellsite, remote actuation and operation, model-centric diagnostics, global collaboration, model-based corrective action, and automation and autonomous action;
  receive, in response to the assessment for the oilfield operation, a plurality of responses comprising a first level of adoption, a second level of adoption, a third level of adoption, and a fourth level of adoption, wherein the first level of adoption represents how frequent the first capability is practiced for the oilfield operation, the second level of adoption represents how frequent the second capability is practiced for the oilfield operation, the third level of adoption represents how frequent the third capability is practiced for the oilfield operation, and the fourth level of adoption represents how frequent the fourth capability is practiced for the oilfield operation;
  compare a level of adoption corresponding to one of the plurality of iteratively defined capabilities with a corresponding goal level of adoption for the one of the plurality of iteratively defined capabilities;
  calculate a plurality of technology maturity scores by calculating a weighted summation for each adoption level in the plurality of responses;
  aggregate the first level of adoption, the second level of adoption, the third level of adoption, and the fourth level of adoption into a TMI for the oilfield operation using the plurality of responses, wherein the TMI is an average of the plurality of technology maturity scores and represents a single measure of adoption of the plurality of iteratively defined capabilities for the oilfield operation; and present the TMI for the oilfield operation.

\* \* \* \* \*